US011955132B2

(12) United States Patent
Tu et al.

(10) Patent No.: US 11,955,132 B2
(45) Date of Patent: Apr. 9, 2024

(54) IDENTIFYING METHOD OF SOUND WATERMARK AND SOUND WATERMARK IDENTIFYING APPARATUS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 211 days.

(21) Appl. No.: 17/715,064

(22) Filed: Apr. 7, 2022

(65) Prior Publication Data

US 2023/0142323 A1 May 11, 2023

(30) Foreign Application Priority Data

Nov. 9, 2021 (TW) ................................ 110141580

(51) Int. Cl.
*G10L 19/018* (2013.01)
*G10L 21/0208* (2013.01)
*G10L 25/78* (2013.01)

(52) U.S. Cl.
CPC ........ *G10L 19/018* (2013.01); *G10L 21/0208* (2013.01); *G10L 25/78* (2013.01); *G10L 2025/783* (2013.01)

(58) Field of Classification Search
None
See application file for complete search history.

(56) References Cited

FOREIGN PATENT DOCUMENTS

| | | |
|---|---|---|
| CN | 101266794 | 9/2008 |
| CN | 112290975 | 1/2021 |

OTHER PUBLICATIONS

D. Gruhl et al., Echo Hiding, 1996 Int'l Workshop on Information Hiding 295 (MIT, 1996) (Year: 1996).*

* cited by examiner

*Primary Examiner* — Walter F Briney, III
(74) *Attorney, Agent, or Firm* — JCIPRNET

(57) ABSTRACT

An identifying method of a sound watermark and a sound watermark identifying apparatus are provided. The method includes the following. A synthesized sound signal is received through a network. Noise interference transferred through the network in the synthesized sound signal is determined according to a reflection-cancelling sound signal. A coding threshold is determined according to the noise interference. A sound watermark signal in the synthesized sound signal is identified according to the coding threshold.

20 Claims, 7 Drawing Sheets

IDENTIFYING METHOD OF SOUND WATERMARK AND SOUND WATERMARK IDENTIFYING APPARATUS

CROSS-REFERENCE TO RELATED APPLICATION

This application claims the priority benefit of Taiwanese application no. 110141580, filed on Nov. 9, 2021. The entirety of the above-mentioned patent application is hereby incorporated by reference herein and made a part of this specification.

BACKGROUND

Technical Field

The disclosure relates to a sound signal processing technology. Particularly, the disclosure relates to an identifying method of a sound watermark and a sound watermark identifying apparatus.

Description of Related Art

Remote conferences enable people in different locations or spaces to have conversations, and conference-related equipment, protocols, and applications are also well developed. It is worth noting that some real-time conference programs may synthesize voice signals with sound watermark signals and use them to identify speaking persons.

Inevitably, if a sound signal is interfered with by noise, a correct rate of determining a watermark at a receiving end may be decreased, thus affecting voice components of a user in the sound signal on a conversation transmission path.

SUMMARY

The embodiments of the disclosure provide an identifying method of a sound watermark and a sound watermark identifying apparatus, in which different coding thresholds can be effectively set for identified sound watermark signal results according to noise in a transmission environment, so as to improve a correct rate of identifying a sound watermark.

According to an embodiment of the disclosure, a sound watermark identification method is adapted for a conference terminal. The identifying method of a sound watermark includes (but is not limited to) the following. A synthesized sound signal is received through a network. The synthesized sound signal includes a sound watermark signal. The sound watermark signal is generated by shifting a phase of a reflected sound signal according to a watermark identification code. The reflected sound signal is a sound signal obtained from simulating a sound emitted by a sound source reflected by an external object and recorded by a sound receiver. Noise interference transferred through the network in the synthesized sound signal is determined according to a reflection-cancelling sound signal. The reflection-cancelling sound signal cancels a sound signal of the watermark identification code of the sound watermark signal being one or more codes in the synthesized sound signal. A coding threshold is determined according to the noise interference. The coding threshold includes a first threshold and a second threshold.

Noise interference corresponding to the first threshold is lower than noise interference corresponding to the second threshold. The first threshold is greater than the second threshold. The sound watermark signal in the synthesized sound signal is identified according to the coding threshold.

According to an embodiment of the disclosure, an identifying apparatus of the sound watermark includes (but is not limited to) a memory and a processor. The memory is configured to store a programming code. The processor is coupled to the memory. The processor is configured to load and execute the programming code to: receive a synthesized sound signal through a network, determine noise interference transferred through the network in the synthesized sound signal according to a reflection-cancelling sound signal, determine a coding threshold according to the noise interference, and identify a sound watermark signal in the synthesized sound signal according to the coding threshold. The synthesized sound signal includes the sound watermark signal. The sound watermark signal is generated by shifting a phase of a reflected sound signal according to a watermark identification code. The reflected sound signal is a sound signal obtained from simulating a sound emitted by a sound source reflected by an external object and recorded by a sound receiver. The reflection-cancelling sound signal cancels a sound signal of the watermark identification code of the sound watermark signal being one or more code in the synthesized sound signal. The coding threshold includes a first threshold and a second threshold. Noise interference corresponding to the first threshold is lower than noise interference corresponding to the second threshold. The first threshold is greater than the second threshold.

In the identifying method of a sound watermark and the sound watermark identifying apparatus according to the embodiments of the disclosure, for the sound watermark signals generated based on the reflected sound signals, noise interference is determined by cancelling the sound watermark signals of different codes, and the corresponding coding threshold is determined for the estimated noise interference, accordingly in response to changing noise interference.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
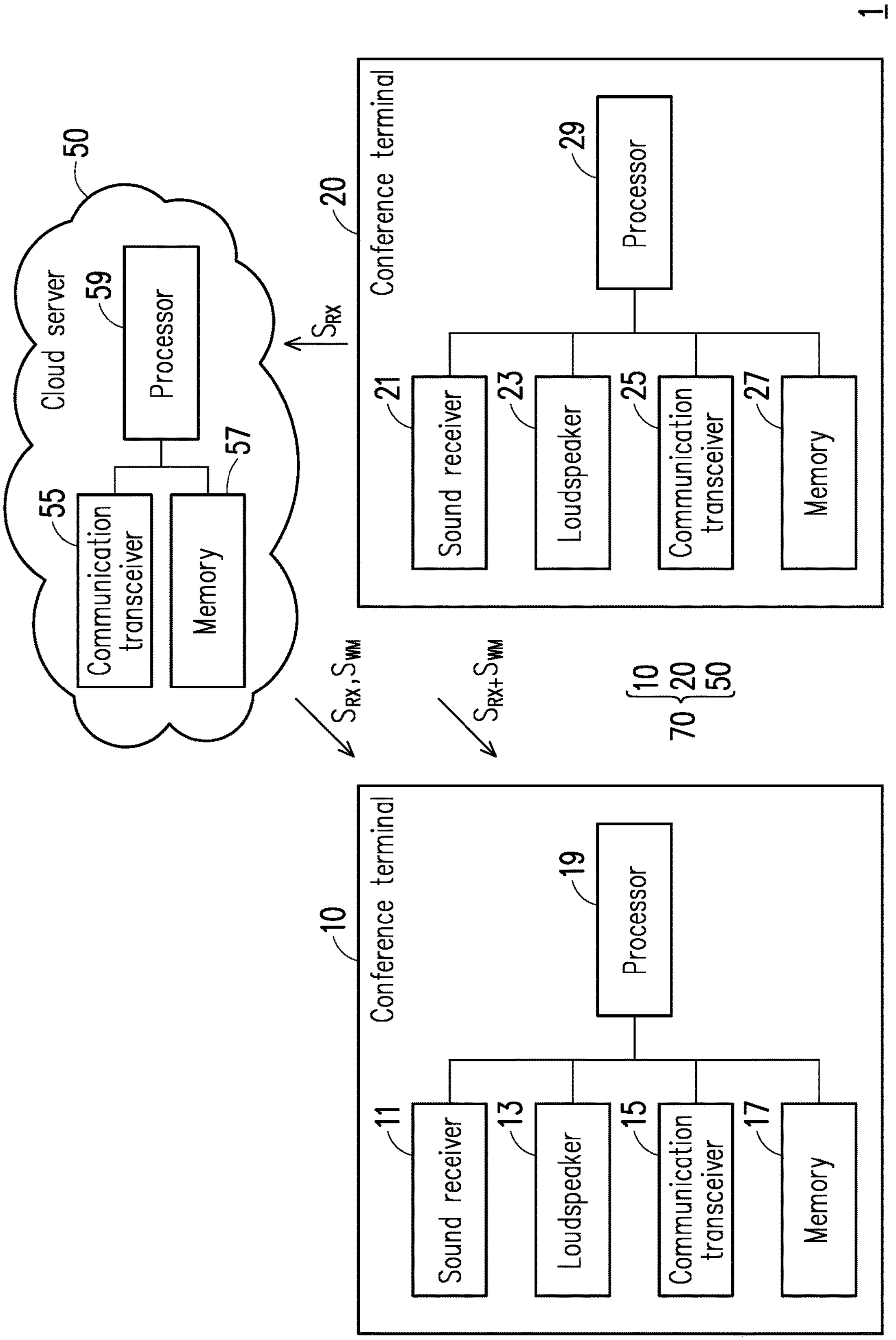
FIG. 1 is a schematic diagram of a conference conversation system according to an embodiment of the disclosure.

FIG. 1 is a schematic diagram of a conference conversation system according to an embodiment of the disclosure.

With reference to FIG. 1, a voice communication system 1 includes but is not limited to conference terminals 10, 20 and a cloud server 50.

The conference terminals 10, 20 may be a wired phone, a mobile phone, an Internet phone, a tablet computer, a desktop computer, a notebook computer, or a smart speaker.

The conference terminal 10 includes (but is not limited to) a sound receiver 11, a loudspeaker 13, a communication transceiver 15, a memory 17, and a processor 19.

The sound receiver 11 may be a microphone in, for example, a dynamic, condenser, or electret condenser form. The sound receiver 11 may also be a combination of other electronic components, analog-to-digital converters, filters, and audio processors that can receive sound waves (e.g., human voice, environmental sound, and machine operation sound) and convert the sound waves into sound signals. In an embodiment, the sound receiver 11 is configured to receive/record sounds of a speaking person to obtain a conversation-received sound signal. In some embodiments, the conversation-received sound signal may include the sound of the speaking person, the sound emitted by the loudspeaker 13, and/or other environmental sounds.

The loudspeaker 13 may be a horn or a sound amplifier. In an embodiment, the loudspeaker 13 is configured to play sounds.

The communication transceiver 15 is, for example, a transceiver (which may include, but is not limited to, elements such as a connection interface, a signal converter, and a communication protocol processing chip) that supports wired networks such as Ethernet, optical fiber networks, or cables. The communication transceiver 15 may also be a transceiver (which may include, but is not limited to, elements such as an antenna, a digital-to-analog/analog-to-digital converter, and a communication protocol processing chip) that supports Wi-Fi, fourth-generation (4G), fifth-generation (5G), or later-generation mobile networks. In an embodiment, the communication transceiver 15 is configured to transmit or receive data.

The memory 17 may be any type of fixed or removable random access memory (RAM), read only memory (ROM), flash memory, a hard disk drive (HDD), a solid-state drive (SSD), or similar elements. In an embodiment, the memory 17 is configured to store programming codes, software modules, configurations, data (e.g., sound signals, watermark identification codes, or sound watermark signals), or files.

The processor 19 is coupled to the sound receiver 11, the loudspeaker 13, the communication transceiver 15, and the memory 17. The processor 19 may be a central processing unit (CPU), a graphic processing unit (GPU), or any other programmable general-purpose or special-purpose microprocessor, digital signal processor (DSP), programmable controller, field programmable gate array (FPGA), application-specific integrated circuit (ASIC), or other similar elements or a combination of the above elements. In an embodiment, the processor 19 is configured to perform all or part of operations of the conference terminal 10, and may load and execute the software modules, files, and data stored in the memory 17.

The conference terminal 20 includes (but is not limited to) a sound receiver 21, a loudspeaker 23, a communication transceiver 25, a memory 27, and a processor 29. For the implementation aspects and functions of the sound receiver 21, the loudspeaker 23, the communication transceiver 25, the memory 27, and the processor 29, reference may be made to the above description of the sound receiver 11, the loudspeaker 13, the communication transceiver 15, the memory 17, and the processor 19, which will not be repeated herein. The sound receiver 21 is configured to receive a reflected sound signal and transmit the reflected sound signal to a processor 59 of the cloud server 50 through the communication transceiver 25.

The cloud server 50 is directly or indirectly connected to the conference terminals 10, 20 through a network. The cloud server 50 may be a computer system, a server, or a signal processing device. In an embodiment, the conference terminals 10, 20 may also serve as the cloud server 50. In another embodiment, the cloud server 50 may serve as an independent cloud server different from the conference terminals 10, 20. In some embodiments, the cloud server 50 includes (but is not limited to) a same or similar communication transceiver 55, memory 57, and processor 59, and the implementation aspects and functions of the elements will not be repeatedly described.

In an embodiment, the identifying apparatus 70 of the sound watermark may be the conference terminals 10, 20, and/or the cloud server 50. The identifying apparatus 70 of a sound watermark is configured to identify a sound watermark signal and will be described in detail in later embodiments.

Hereinafter, a method according to an embodiment of the disclosure in combination with the various devices, elements, and modules in the conference communication system 1 will be described. Each process flow of the method may be adjusted according to the implementation, and is not limited thereto.

It should also be noted that, for ease of description, the same element may perform the same or similar operations, and will not be repeatedly described. For example, the processor 19 of the conference terminal 10, the processor 29 of the conference terminal 20, and/or the processor 59 of the cloud server 50 may each perform a method same as or similar to the method of the embodiment of the disclosure.

Figure 2:
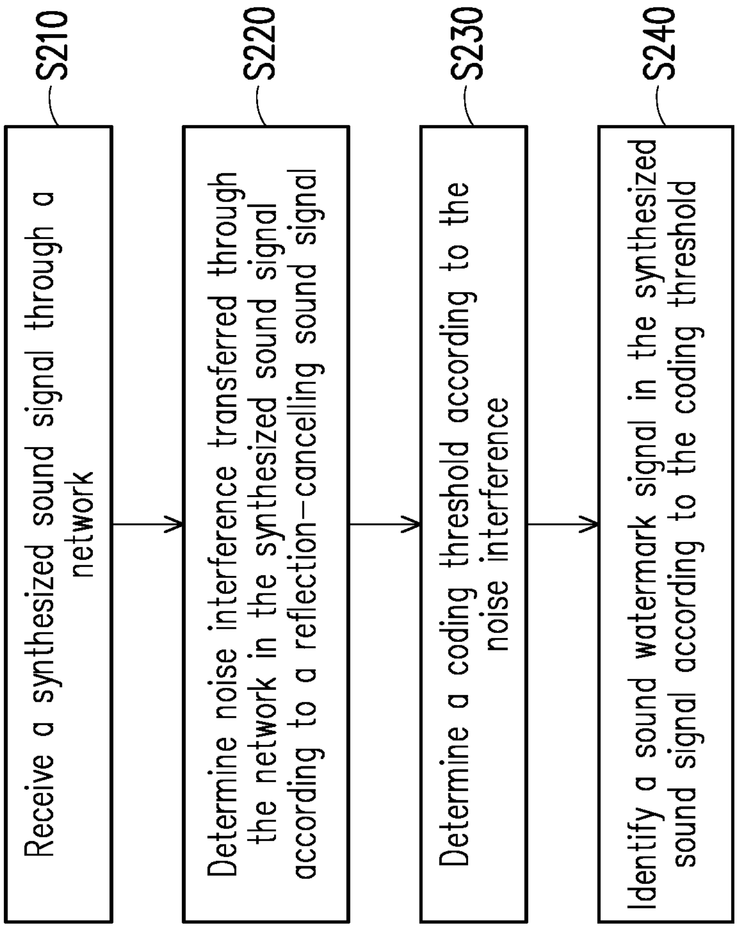
FIG. 2 is a flowchart of an identifying method of a sound watermark according to an embodiment of the disclosure.

FIG. 2 is a flowchart of an identifying method of a sound watermark according to an embodiment of the disclosure. With reference to FIG. 2, the processor 19 receives a synthesized sound signal $S_A$ through a network (step S210). Specifically, assuming that conference terminals 10, 20 establish a conference call, for example, by video software, voice call software, or a phone call, then speaking persons may start speaking. After sounds are recorded/received by the sound receiver 21, the processor 29 obtains a conversation-received sound signal $S_{Rx}$. The conversation-received sound signal $S_{Rx}$ is related to voice contents of the speaking person corresponding to the conference terminal 20 (and may also include environmental sounds or other noise). The processor 29 of the conference terminal 20 may transmit the conversation-received sound signal SRx through the communication transceiver 25 (i.e., through a network interface). In some embodiments, the conversation-received sound signal SRx may be performed with echo cancellation, noise filtering, and/or other sound signal processing.

Then, the processor 59 of the cloud server 50 receives the conversation-received sound signal $S_{Rx}$ from the conference terminal 20 through the communication transceiver 55. The processor 59 generates a reflected sound signal $S'_{Rx}$ according to a virtual reflection condition and the conversation-received sound signal $S_{Rx}$. Specifically, general echo cancellation algorithms may adaptively cancel components (e.g., the conversation-received sound signal $S_{Rx}$ on a conversation-received path) belonging to reference signals in the sound signals received by the sound receivers 11, 21 from the outside. The sounds recorded by the sound receivers 11, 21 include the shortest paths from the loudspeakers

13, 23 to the sound receivers 11, 21 and different reflection paths of the environment (i.e., paths formed when sounds are reflected by external objects). Positions of reflection affect the time delay and the amplitude attenuation of the sound signal. In addition, the reflected sound signal may also come from different directions, resulting in phase shifts.

Figure 3:
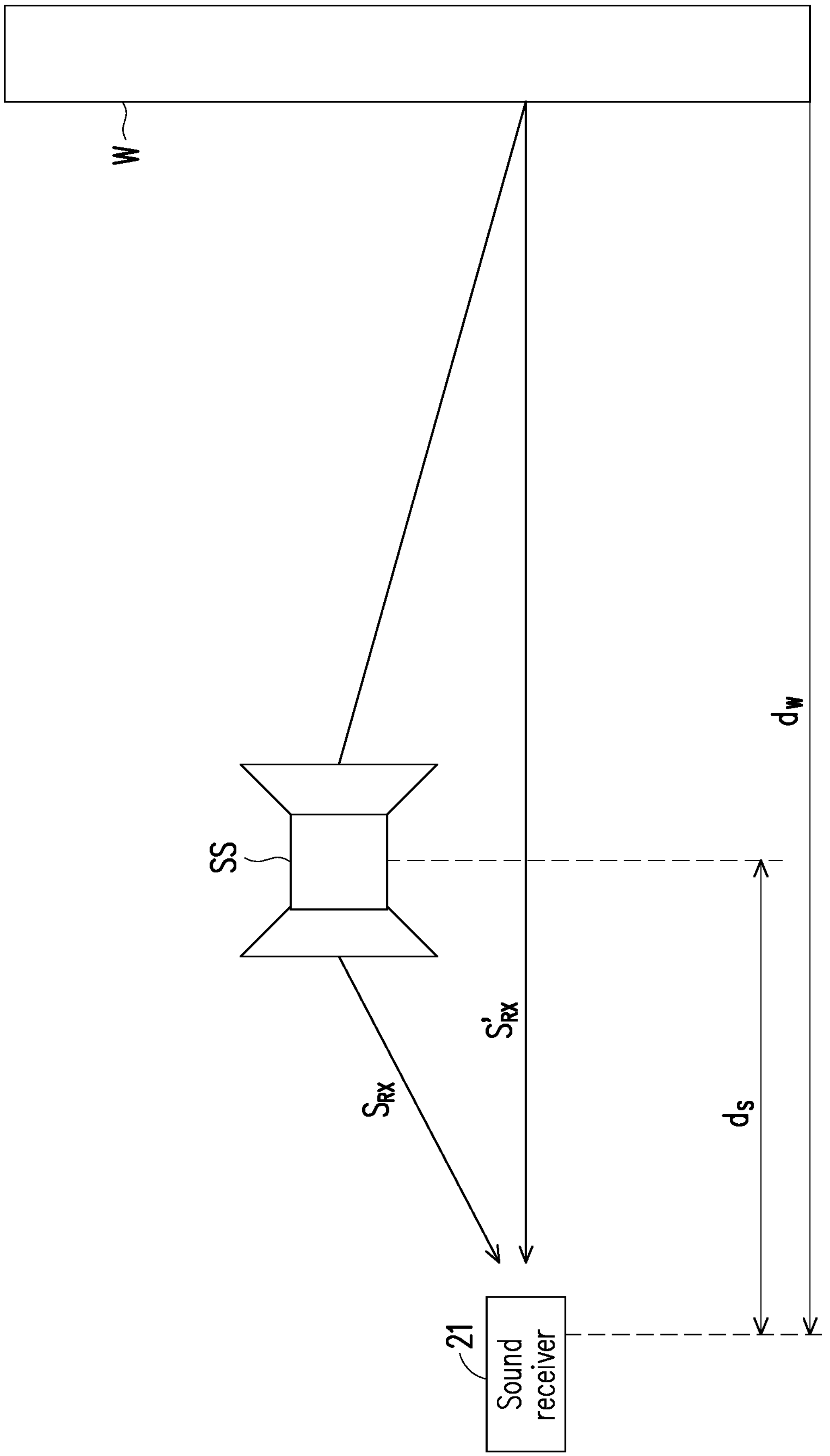
FIG. 3 is a schematic diagram showing a virtual reflection condition according to an embodiment of the disclosure.

In an embodiment, the processor 59 may determine a time delay and an amplitude attenuation of the reflected sound signal $S'_{RX}$ relative to the conversation-received sound signal $S_{Rx}$ according to the positional relationship. For example, FIG. 3 is a schematic diagram showing a virtual reflection condition according to an embodiment of the disclosure. With reference to FIG. 3, it is assumed that the virtual reflection condition is a wall (i.e., an external object), where a distance between the sound receiver 21 and a sound source SS is $d_s$ (e.g., 0.3, 0.5, or 0.8 meters), and a distance between the sound receiver 21 and a wall W is $d_w$ (e.g., 1, 1.5, or 2 meters). Under such conditions, the relationship between the reflected sound signal $S'_{Rx}$ and the conversation-received sound signal $S_{Rx}$ may be expressed as follows:

$$s'_{Rx}(n)=\alpha_1 \cdot s_{Rx}(n-n_{w1}) \quad (1)$$

where $\alpha_1$ is the amplitude attenuation caused by reflection (i.e., reflection of a sound signal blocked by the wall W), n is the sampling point or time, $n_w$ is the time delay caused by the reflection distance (i.e., the distance from the sound source SS through the wall W to the sound receiver 21).

In an embodiment of the disclosure, the processor 59 shifts a phase of the reflected sound signal according to a watermark identification code, and generates a sound watermark signal $S_{WM}$ accordingly. Specifically, the processor 59 shifts the phase of the reflected sound signal according to the watermark identification code to generate a sound watermark signal. During operation of a general echo cancellation mechanism, compared to the phase shift of the reflected sound signal, changes in the time delay and the amplitude of the reflected sound signal have a greater influence on errors of the echo cancellation mechanism. With the changes, it is like being in a completely new interfering environment to which the echo cancellation mechanism needs to be re-adapted. Therefore, in the watermark identification code according to the embodiment of the disclosure, sound watermark signals corresponding to different values have only phase differences, but the time delay and the amplitude are the same. In other words, the sound watermark signals include one or more phase-shifted reflected sound signals.

In an embodiment, the watermark identification code is encoded in a multi-based positional numeral system, and the multi-based positional numeral system provides multiple values at one bit or each of multiple bits of the watermark identification code. Taking a binary system as an example, the value of each bit in the watermark identification code may be "0" or "1". Taking a hexadecimal system as an example, the value of each bit in the watermark identification code may be "0", "1", "2", . . . , "E", or "F". In another embodiment, the watermark identification code is encoded with an alphabet, a character, and/or a symbol. For example, the value of each bit in the watermark identification code may be any one of "A" to "Z" among English alphabets.

In an embodiment, the different values at the bits in the watermark identification code correspond to different phase shifts. For example, assuming that the watermark identification code $W_0$ is in a base-N positional numeral system (where N is a positive integer), then an N number of values may be provided for each bit. The N number of different values respectively correspond to different phase shifts $\varphi_1$ to $\varphi_N$. For another example, assuming that the watermark identification code $W_0$ is a binary system, then two values (i.e., 1 and 0) may be provided for each bit. The two different values respectively correspond to two phase shifts $\varphi$ and $-\varphi$. For example, the phase shift $\varphi$ is 90°, and the phase shift $-\varphi$ is −90° (i.e., −1).

The processor 59 may shift the phase of the reflected sound signal (with or without a process of high-pass filtering) according to the value of one or more bits in the watermark identification code. Taking a base-N positional numeral system as an example, the processor 59 selects one or more of the phase shifts $\varphi_1$ to $\varphi_N$ according to one or more values in the watermark identification code, and performs phase shift using the selected one of the phase shifts $\varphi_1$ to $\varphi_N$. For example, if the value of the first bit of the watermark identification code is 1, an output phase-shifted reflected sound signal $S\varphi_1$ is shifted by $\varphi_1$ relative to the reflected sound signal, and inference may be made by analogy for other reflected sound signals $S\varphi_N$. The phase shift may be achieved using Hilbert transform or other phase shift algorithms.

The processor 19 of the conference terminal 10 receives the sound watermark signal $S_{WM}$ or a watermark-embedded signal $S_{Rx}+S_{WM}$ through the communication transceiver 15 via the network to obtain the synthesized sound signal $S_A$ (i.e., the transmitted sound watermark signal $S_{WM}$ or watermark-embedded signal $S_{Rx}+S_{WM}$).

With reference to FIG. 2, the processor 19 determines noise interference transferred through the network in the synthesized sound signal $S_A$ according to a reflection-cancelling sound signal (step S220). Specifically, the reflection-cancelling sound signal cancels a sound signal of the watermark identification code of the sound watermark signal $S_{WM}$ being one or more codes in the synthesized sound signal $S_A$. The codes refer to the values or symbols provided by encoding of the multi-based positional numeral system or by other encoding mechanisms. The reflection-cancelling sound signal will be described in detail in subsequent embodiments.

During the transmission from the cloud server 50 to the conference terminal 10 through the network, since the output signal (i.e., the transmitted sound watermark signal $S_{WM}$ or watermark-embedded signal $S_{Rx}+S_{WM}$) becomes an attenuated sound signal $S_T$ through an amplitude attenuation aT and is interfered with by noise $N_T$. A signal-to-noise ratio (SNR) between the sound signal and the noise $N_T$ is $SNR_T=20\cdot\log(S_T/N_T)$. It is worth noting that if a fixed threshold is adopted in identification of a sound watermark signal, it may not be applicable to different noise environments.

With reference to FIG. 2, the processor 19 determines a coding threshold according to the noise interference (step S230). Specifically, the coding threshold includes a first threshold and a second threshold, noise interference corresponding to the first threshold is lower than noise interference corresponding to the second threshold, and the first threshold is greater than the second threshold. For example, the first threshold is 1.9, and the second threshold is 0.3. A signal-to-noise ratio of the noise interference corresponding to the first threshold is $SNR_T=\infty$dB (i.e., no noise interference), and a signal-to-noise ratio of the noise interference corresponding to the second threshold is $SNR_T=-6$ dB (i.e., high noise interference). In this example, the values of the first threshold and the second threshold are obtained through experimental proofs. However, the values of the first threshold and the second threshold may still be changed depending on actual requirements, which is not limited by the embodiments of the disclosure.

Figure 4:
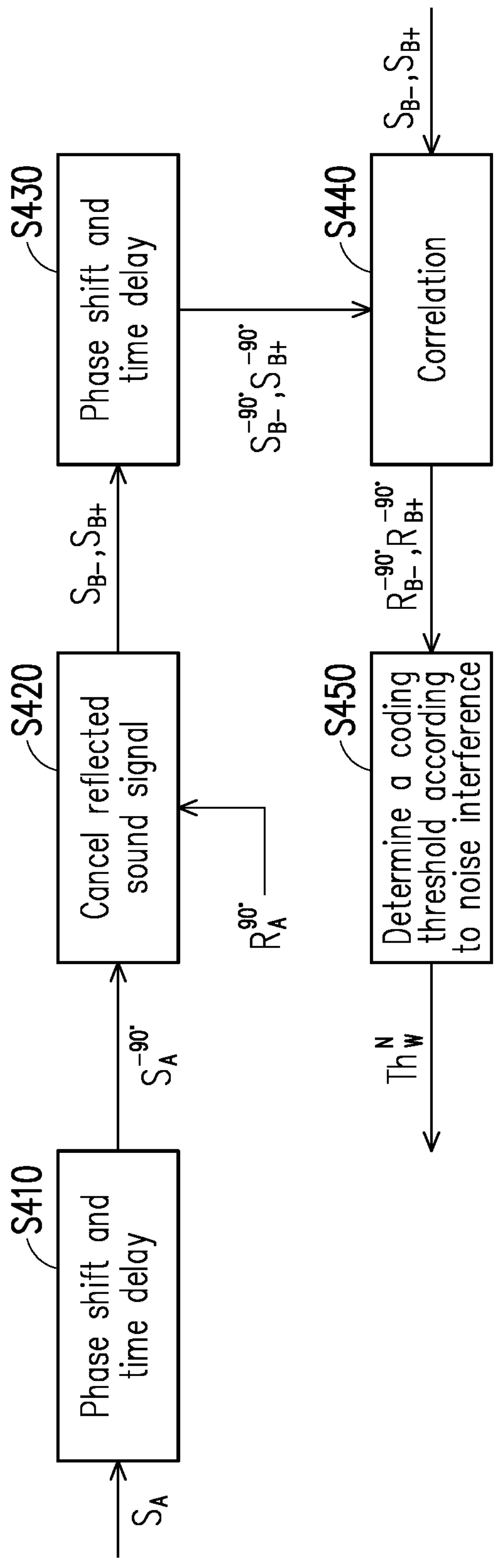
FIG. 4 is a flowchart of a method for generating a coding threshold according to an embodiment of the disclosure.

FIG. 4 is a flowchart of a method for generating a coding threshold according to an embodiment of the disclosure. With reference to FIG. 4, in an embodiment, the processor 19 generates a pre-processed sound signal $s_A^{-90°}$ according to a delay time $n_w$ and the synthesized sound signal $S_A$. The pre-processed sound signal $s_A^{-90°}$ is obtained from the synthesized sound signal $S_A$ being phase-shifted (e.g., by 90° or −90° and delayed by the delay time $n_w$(step S410). It should be noted that a binary encoded watermark identification code is taken as an example (i.e., only two values are provided) in this embodiment, and the two values respectively correspond to, for example, phase shifts by 90° and −90°. However, if other encodings are used, there may be different phase shifts. The relationship between the pre-processed sound signal $s_A^{-90°}$ and the synthesized sound signal $S_A$ may be expressed as follows:

$$s_A^{-90°}(n)=s_A^{90°}(n-n_w) \tag{2}$$

In other words, the pre-processed sound signal $s_A^{-90°}$ is the synthesized sound signal $S_A$ being phase-shifted by 90° and time-delayed by $n_w$.

The relationship between the synthesized sound signal $S_A$ and the original conversation-received sound signal $S_{Rx}$ may be expressed as follows:

$$s_A(n)=\begin{cases}\alpha_T\cdot\left[S_{Rx}(n)+\alpha_w\cdot s_{RX}^{90°}(n-n_w)\right]+N_T(n),\ W_0=1\\ \alpha_T\cdot\left[S_{Rx}(n)-\alpha_w\cdot s_{RX}^{90°}(n-n_w)\right]+N_T(n),\ W_0=0\\ \alpha_T\cdot[S_{Rx}(n)+\alpha_w\cdot s_{Rx}(n-n_w)]+N_T(n),\ W_0=N/A\end{cases} \tag{3}$$

where the conversation-received sound signal $s_{Rx}$ is phase-shifted by 90° into $s_{RX}^{90°}$, $N_T$ is the noise interference, and $\alpha_w$ is the amplitude attenuation. In addition, the conversation-received sound signal $s_{RX}^{90°}(n)$ is delayed by the delay time $n_w$ into $s_{RX}^{90°}(n-n_w)$. By the relations between the pre-processed sound signal $s_A^{-90°}$ and the synthesized sound signal $S_A$, the following can be drawn about the relationship between the pre-processed sound signal $s_A^{-90°}$ and the conversation-received sound signal $S_{Rx}$:

$$s_A^{-90°}(n)=\begin{cases}\alpha_T\cdot\left[s_{RX}^{90°}(n-n_w)-\alpha_w\cdot S_{Rx}(n-2\cdot n_w)\right]+N_T^{90°}(n-n_w),\ W_0=1\\ \alpha_T\cdot\left[s_{RX}^{90°}(n-n_w)+\alpha_w\cdot S_{Rx}(n-2\cdot n_w)\right]+N_T^{90°}(n-n_w),\ W_0=0\\ \alpha_T\cdot\left[s_{RX}^{90°}(n-n_w)+\alpha_w\cdot s_{RX}^{90°}(n-2\cdot n_w)\right]+N_T^{90°}(n-n_w),\ W_0=N/A\end{cases} \tag{4}$$

where $\alpha_w$ is the amplitude attenuation, $N_T$ is the noise interference, and the noise interference $N_T$ is phase-shifted by 90° into $N_T^{90°}$.

Then, the processor 19 generates a first sound signal $s_{B-}$ and a second sound signal $s_{B+}$ according to the synthesized sound signal $S_A$ and the pre-processed sound signal $s_A^{-90°}$ (step S420). In an embodiment, at least one code of the watermark identification code includes a first code and a second code (e.g., $W_0$=1 and $W_0$=0), and the reflection-cancelling sound signal includes the first sound signal $s_{B-}$ and the second sound signal $s_{B+}$. The first sound signal $s_{R-}$ cancels the sound signal of which the watermark identification code is the first code (e.g., $W_0$=1), and the second sound signal $s_{B+}$ cancels the sound signal of which the watermark identification code is the second code (e.g., $W_0$=0).

The relationship between the first sound signal $S_{B-}$ and the synthesized sound signal $S_A$ may be expressed as follows:

$$s_{B-}=s_A-\alpha_w\cdot s_A^{-90°} \tag{5}$$

The relationship between the first sound signal $S_{B-}$ and the conversation-received sound signal $S_{Rx}$ may be expressed as follows:

$$s_{B-}(n)=\begin{cases}\alpha_T\cdot\left[S_{RX}(n)+\alpha_w^2\cdot S_{Rx}(n-2\cdot n_w)\right]+N_T(n)-\alpha_w\cdot N_T^{90°}(n-n_w),\ W_0=1\\ \alpha_T\cdot\left[S_{RX}(n)-2\cdot\alpha_w\cdot s_{RX}^{90°}(n-n_w)-\alpha_w^2\cdot S_{Rx}(n-2\cdot n_w)\right]\\ \quad +N_T(n)-\alpha_w\cdot N_T^{90°}(n-n_w),\ W_0=0\\ \alpha_T\cdot\left[S_{RX}(n)+\alpha_w\cdot s_{RX}(n-n_w)\alpha_w\cdot s_{RX}^{90°}(n-n_w)-\alpha_w^2\cdot s_{RX}^{90°}(n-2\cdot n_w)\right]+\\ \quad N_T(n)-\alpha_w\cdot N_T^{90°}(n-n_w),\ W_0=N/A\end{cases} \tag{6}$$

The relationship between the second sound signal $S_{B+}$ and the synthesized sound signal $S_A$ may be expressed as follows:

$$s_{B+}=S_A+\alpha_w\cdot s_A \tag{7}$$

The relationship between the second sound signal $S_{B+}$ and the conversation-received sound signal $S_{Rx}$ may be expressed as follows:

$$s_{B+}(n)=\begin{cases}\alpha_T\cdot\left[S_{RX}(n)+2\cdot\alpha_w\cdot s_{RX}^{90°}(n-n_w)-\alpha_w^2\cdot s_{Rx}(n-2\cdot n_w)\right]+N_T(n)+\\ \quad \alpha_w\cdot N_T^{90°}(n-n_w),\ W_0=1\\ \alpha_T\cdot\left[S_{RX}(n)+\alpha_w^2\cdot S_{RX}(n-2\cdot n_w)\right]N_T(n)+\alpha_w\cdot\\ \quad N_T^{90°}(n-n_w),\ W_0=0\\ \alpha_T\cdot\left[S_{Rx}(n)+\alpha_w\cdot S_{RX}(n-n_w)+\alpha_w\cdot s_{RX}^{90°}(n-n_w)+\alpha_w^2\cdot s_{RX}^{90°}(n-2\cdot n_w)\right.\\ \quad +N_T(n)+\alpha_w\cdot N_T^{90°}(n-n_w),\ W_0=N/A\end{cases} \tag{8}$$

With reference to FIG. 4, the processor 19 generates a third sound signal $s_{B-}^{-90°}$ according to the first sound signal $S_{B-}$, and generates a fourth sound signal $s_{B+}^{-90°}$ according to the second sound signal $S_{B+}$ (step S430). Specifically, the first sound signal $S_{B-}$ is phase-shifted and/or delayed by a time to generate the third sound signal $s_{B-}^{-90°}$, and the second sound signal $S_{B+}$ is phase-shifted and/or delayed by a time to generate the fourth sound signal $s_{B+}^{-9°}$. In an embodiment, the first sound signal $s_{B-}$ is phase-shifted by 90° and delayed by the delay time $n_w$ to obtain the third sound signal $s_{B-}^{-90°}$. The relationship between the third sound signal $s_{B-}^{-90°}$ and the first sound signal $s_{B-}$ may be expressed as follows:

$$s_{B-}^{-90°}(n)=s_{B-}^{-90°}(n-n_w) \tag{9}$$

In addition, the second sound signal $s_{B+}^{-90°}$ is phase-shifted by 90° and delayed by the delay time $n_w$ to obtain the fourth sound signal $s_{B+}^{-90°}$. The relationship between the fourth sound signal $s_{B+}^{-90°}$ and the second sound signal $s_{B+}$ may be expressed as follows:

$$s_{B+}^{-90°}(n)=(n-n_w) \tag{10}$$

With reference to FIG. 4, the processor 19 respectively determines a first correlation $R_{B-}^{90°}$ and a second correlation $R_{B+}^{90°}$ according to the third sound signal $s_{B-}^{-90°}$ and the fourth sound signal $s_{B+}^{-90°}$ (step S440). Specifically, the processor 19 calculates the cross-correlation between the first sound signal $s_{B-}$ and the third sound signal $s_{B-}^{-90°}$ to obtain the first correlation $R_{B-}^{90^\circ}$. In addition, the processor 19 calculates the cross-correlation between the second sound signal $s_{B+}$ and the fourth sound signal $s_{B+}^{-90^\circ}$ to obtain the second correlation $R_{B+}^{90^\circ}$.

It is worth noting that a difference between absolute values of the first correlation $R_{B-}^{90^\circ}$ and the second correlation $R_{B+}^{90^\circ}$ corresponds to the magnitude of the noise interference. For example, the relationship between the first correlation $R_{B-}^{90^\circ}$, the signal-to-noise ratio $SNR_T$ corresponding to the noise interference, and the watermark identification code $W_0$ may be expressed as follows:

TABLE 1

| $R_{B-}^{90^\circ}$ | $W_0 = 1$ | $W_0 = 0$ | $W_0 = N/A$ |
|---|---|---|---|
| $SNR_T = \infty$ dB | ±0.4 | −8.5 | −6 |
| $SNR_T = -6$ dB | −4.8 | −5.7 | −5 |

In other words, when the watermark identification code is the first code (e.g., $W_0=1$), the parts $N_T^{90^\circ}(n-n_w)$ in the first sound signal $s_{B-}$ and the third sound signal $s_{B-}^{-90^\circ}$ are negatively correlated only in a large noise environment (e.g., the signal-to-noise ratio $SNR_T=-6$ dB), and are irrelevant (e.g., $R_{B-}^{90^\circ}=\pm 0.4$) under a noise-free environment ($SNR_T=\infty$dB), and the correlation is high and negative (e.g., $R_{B-}=\pm 0.4$) in a large noise environment. When the watermark identification code is the second code (e.g., $W_0=0$), the parts $s_{Rx}^{90^\circ}(n-n_w)$, $s_{Rxl\ (n-}2\cdot n_w)$, and $N_T^{90^\circ}(n-n_w)$ in the first sound signal $s_{B-}$ and the third sound signal $s_{B-}^{-90^\circ}$ are all negatively correlated. The correlation is high and negative (e.g., $R_{B-}^{90^\circ}=-8.5$) under a noise-free environment ($SNR_T=\infty$dB), and the correlation is high and negative (e.g., $R_{B-}^{90^\circ}=-5.7$) in a large noise environment ($SNR_T=-6$ dB). When the watermark identification code is not present in the synthesized sound signal $S_A$ (e.g., $W_0$=N/A or is not any code), $s_{Rx}^{90^\circ}(n-n_w)$, $s_{Rx}(n-2\cdot n_w)$, and $N_T^{90^\circ}(n-n_w)$ in the first sound signal $s_{B-}$ and the third sound signal $s_{B-}^{-90^\circ}$ are all negatively correlated. The correlation is high and negative (e.g., $R_{B-}^{90^\circ}=-6$) when there is no noise, and the correlation is high and negative (e.g., $R_{B-}^{90^\circ}=-5$) in a large noise environment. In other words, when the watermark identification code is the first code ($W_0=1$), the noise interference (i.e., $SNR_T=\infty$dB or $SNR_T=-6$ dB) in the network transfer may be determined through the first correlation $R_{B-}^{90^\circ}$.

Then, the relationship between the second correlation $R_{B+}^{90^\circ}$, the noise interference $SNR_T$, and the watermark identification code $W_0$ may be expressed as follows:

TABLE 2

| $R_{B+}^{90^\circ}$ | $W_0 = 1$ | $W_0 = 0$ | $W_0 = N/A$ |
|---|---|---|---|
| $SNR_T = \infty$ dB | 8.5 | ±0.4 | 6 |
| $SNR_T = -6$ dB | 5.7 | 4.8 | 5 |

As can be seen from Table (2), when the watermark identification code is the first code (e.g., $W_0=1$), the parts $s_{Rx}^{90^\circ}(n-n_w)$, $s_{Rx}(n-2\cdot n_w)$, and $N_T^{90^\circ}(n-n_w)$ in the second sound signal $S_{B+}$ and the fourth sound signal $s_{B+}^{-90^\circ}$ are all positively correlated in a large noise environment (e.g., $SNR_T=-6$ dB). The second correlation $R_{b-}^{90^\circ}$ is high and positive (e.g., $R_{B+}^{90^\circ}=8.5$) under a noise-free environment (e.g., $SNR_T=\infty$dB), and the second correlation $R_{B+}^{90^\circ}$ is high and positive (e.g., $R_{B+}^{90^\circ}=5.7$) in a large noise environment. When the watermark identification code is the second code (e.g., $W_0=0$), only the parts of the noise $N_T^{90^\circ}(n-n_w)$ in the second sound signal $S_{B+}$ and the fourth sound signal $s_{B+}^{-90^\circ}$ is positively correlated. The correlation is low (e.g., $R_{B+}^{90^\circ}=\pm 0.4$) under a noise-free environment (e.g., $SNR_T=\infty$dB), and the correlation is high and positive (e.g., $R_{B+}^{90^\circ}=4.8$) in a large noise environment (e.g., $SNR_T=-6$ dB). When the watermark identification code is not present in the synthesized sound signal $S_A$ (i.e., $W_0$=N/A or is not any code), $s_{Rx}^{90^\circ}(n-n_w)$, $s_{Rx}(n-2\cdot n_w)$, and $N_T^{90^\circ}(n-n_w)$ in the second sound signal $S_{B+}$ and the fourth sound signal $s_{B+}^{-90^\circ}$ are all positively correlated. The correlation is high and positive (e.g., $R_{B+}^{90^\circ}=6$) when there is no noise, and the correlation is high and positive (e.g., $R_{B+}^{90^\circ}=5$) in a large noise environment. In other words, when the watermark identification code is the second code (e.g., $W_0=0$), the noise interference (i.e., $SNR_T=\infty$dB or $SNR_T=-6$ dB) in the network transfer may be determined through the second correlation $R_{B+}^{90^\circ}$.

With reference to FIG. 4, the processor 19 determines a coding threshold $Th_W^N$ according to the first correlation $R_{B-}^{90^\circ}$ and the second correlation $R_{B+}^{90^\circ}$ (step S450). Specifically, the difference between the absolute values of the first correlation $R_{B-}^{90^\circ}$ and the second correlation $R_{B+}^{90^\circ}$ corresponds to the magnitude of the noise interference.

In an embodiment, the processor 19 determines the coding threshold $Th_W^N$ according to a correlation ratio. The correlation ratio is related to an absolute value of a sum of the first correlation $R_{B-}^{90^\circ}$ and the second correlation $R_{B+}^{90^\circ}$, and a greatest one of the absolute values of the first correlation $R_{b-}^{90^\circ}$ and the second correlation $R_{B+}^{90^\circ}$. In addition, the coding threshold $Th_W^N$ in this embodiment is configured for identifying whether the sound watermark signal $S_{WM}$ in the synthesized sound signal $S_A$ is the at least one code, for example, whether the sound watermark signal $S_{WM}$ is one of 1 and 0. The relationship between the coding threshold $Th_W^N$, the first correlation $R_{B-}^{90^\circ}$, and the second correlation $R_{B+}^{90^\circ}$ may be expressed as follows:

$$Th_w^N = \frac{2\cdot\left|R_{B-}^{90^\circ} + R_{B+}^{90^\circ}\right|}{\max\left\{\left|R_{B-}^{90^\circ}\right|, \left|R_{B+}^{90^\circ}\right|\right\}} \tag{11}$$

With the properties of the first correlation $R_{B-}^{90^\circ}$ and the second correlation $R_{B+}^{90^\circ}$, the relationship between the coding threshold $Th_W^N$, the noise interference $SNR_T$, and the watermark identification code $W_0$ can be drawn, which is expressed as follows:

TABLE 3

| $Th_W^N$ | $W_0 = 1$ | $W_0 = 0$ | $W_0 = N/A$ |
|---|---|---|---|
| $SNR_T = \infty$ dB | 1.9 | 1.9 | 0.3 |
| $SNR_T = -6$ dB | 0.3 | 0.3 | 0.3 |

As can be known from Table (1), Table (2), and Table (3), when the watermark identification code is the first code or the second code and no noise interference is present in the network transfer environment (e.g., $SNR_T=\infty$dB), the difference between the absolute values of the first correlation $R_{B-}^{90^\circ}$ and the second correlation $R_{B+}^{90^\circ}$ is greater, and the first correlation $R_{B-}^{90^\circ}$ and the second correlation $R_{B+}^{90^\circ}$ are respectively a positive number and a negative number. Therefore, the value of the coding threshold $Th_W^N$ corresponding to the noise interference is 1.9 (i.e., the first threshold). When noise is present in the network transmission environment (e.g., $SNR_T=-6$ dB), the difference between the absolute values of the first correlation $R_{B-}^{90^\circ}$ and the second correlation $R_{B+}^{90°}$ is less, and the first correlation $R_{B-}^{90°}$ and the second correlation $R_{B-}^{90°}$ are respectively a positive number and a negative number. Therefore, the value of the coding threshold $Th_W^N$ corresponding to the noise interference is 0.3 (i.e., the second threshold). When the watermark identification code is not present in the synthesized sound signal $S_A$ (i.e., $W_0$=N/A), due to the less difference between the absolute values of the first correlation $R_{B-}^{90°}$ and the second correlation $R_{B+}^{90°}$, the value of the coding threshold $Th_W^N$ is 0.3 regardless of the magnitude of the noise interference.

Figure 5:
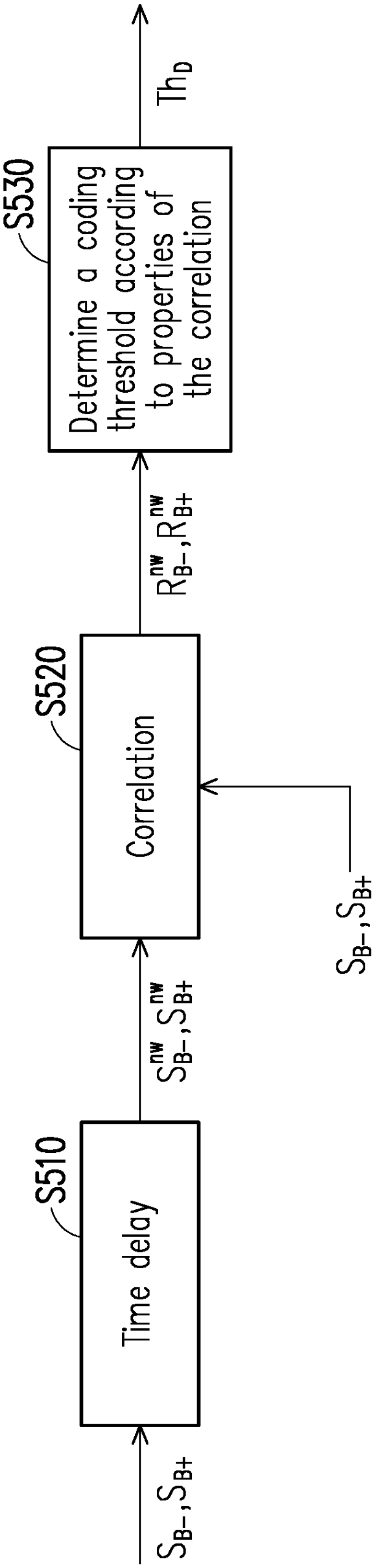
FIG. 5 is a flowchart showing determination of a coding threshold according to an embodiment of the disclosure.

With reference to FIG. 5, in another embodiment, the processor 19 generates a third sound signal $s_{B-}^{n_w}$ according to the first sound signal $s_{B-}$, and generate a fourth sound signal $s_{B+}^{n_w}$ according to the second sound signal $s_{B+}$ (step S510). Different from the embodiment corresponding to FIG. 4, in this embodiment, the first sound signal $s_{B-}$ is delayed by the delay time $n_w$ to obtain the third sound signal $s_{B-}^{n_w}$, and the second sound signal $s_{B+}$ is delayed by the delay time $n_w$ to obtain the fourth sound signal $s_{B+}^{n_w}$. In this embodiment, the relationship between the third sound signal $s_{B-}^{n_w}$ and the first sound signal $s_{B-}$ may be expressed as follows:

$$s_{B-}^{n_w}(n)=s_{B-}(n-n_w) \quad (12)$$

In addition, the relationship between the fourth sound signal $s_{B+}^{n_w}$ and the second sound signal $s_{B+}$ may be expressed as follows:

$$s_{B+}^{n_w}(n)=s_{B+}(n-n_w) \quad (13)$$

With reference to FIG. 5, the processor 19 respectively determines a first correlation $R_{B-}^{n_w}$ and a second correlation $R_{B+}^{n_w}$ according to the third sound signal $s_{B-}^{n_w}$ and the fourth sound signal $s_{B+}^{n_w}$ (step S520). Specifically, the processor 19 calculates the cross-correlation between the first sound signal $s_{B-}$ and the third sound signal $s_{B-}^{n_w}$ to obtain the first correlation $R_{B-}^{n_w}$, and calculates the cross-correlation between the second sound signal $s_{B+}$ and the fourth sound signal $s_{B+}^{n_w}$ to obtain the second correlation $R_{B+}^{n_w}$. A difference between absolute values of the first correlation $R_{B-}^{n_w}$ and the second correlation $R_{B+}^{n_w}$ corresponds to the magnitude of the noise interference. For example, the relationship between the first correlation $R_{B-}^{n_w}$ or the second correlation $R_{B+}^{n_w}$, the signal-to-noise ratio $SNR_T$ corresponding to the noise interference, and the watermark identification code $W_0$ may be expressed as follows:

TABLE 4

| $R_{B-}^{n_w}/R_{B+}^{n_w}$ | $W_0 = 1$ | $W_0 = 0$ | $W_0$ = N/A |
|---|---|---|---|
| $SNR_T = \infty$ dB | ±0.3 | ±0.3 | 5 |
| $SNR_T = -6$ dB | ±0.3 | ±0.3 | 0.25 |

In other words, when the watermark identification code is the first code (e.g., $W_0$=1) or the second code (e.g., $W_0$=0), the results of the first correlation $R_{B-}^{n_w}$ and the second correlation $R_{B+}^{n_w}$ are not correlated. In other words, the first sound signal $s_{B-}$ and the third sound signal $s_{B-}^{n_w}$ are not related to each other. Also, the second sound signal $s_{B-}$ and the fourth sound signal $s_{B+}^{n_w}$ are not related to each other. It is worth noting that, only when the watermark identification code is not present in the synthesized sound signal $S_A$ (i.e., $W_0$=N/A), $s_{Rx}(n-n_w)$ and $s_{Rx}^{90°}(n-2\cdot n_w)$ in the sound signals are positively correlated, and the noise part is not correlated.

Therefore, when the watermark identification code is not present in the synthesized sound signal $S_A$ (i.e., $W_0$=N/A), the correlation is high and positive ($R_{B-}^{n_w}$=5) when the transfer environment is noise-free ($SNR_T$=∞dB), and the correlation is low and positive ($R_{B-}^{n_w}$=0.25) when the transfer environment is a large noise environment ($SNR_T$=−6 dB).

With reference to FIG. 5, then, the processor 19 determines a coding threshold $Th_D$ according to a sum of the first correlation $R_{B-}^{n_w}$ and the second correlation $R_{B+}^{n_w}$ (step S530). It is worth noting that the coding threshold $Th_D$ in this embodiment is configured for identifying whether at least one code is present in the sound watermark signal in the synthesized sound signal $S_A$, for example, whether the sound watermark signal is N/A. The relationship between the coding threshold $Th_D$ and the first correlation $R_{B-}^{n_w}$ and the second correlation $R_{B+}^{n_w}$ may be expressed as follows:

$$Th_D=R_{B+}^{n_w}+R_{B-}^{n_w} \quad (14)$$

Then, according to Table (4) and the properties of the first correlation $R_{B-}^{n_w}$ and the second correlation $R_B^{n_w}$, the relationship between the coding threshold $Th_D$, the noise interference $SNR_T$, and the watermark identification code $W_0$ can be drawn, and may be expressed as follows:

TABLE 5

| $Th_D$ | $W_0 = 1$ | $W_0 = 0$ | $W_0$ = N/A |
|---|---|---|---|
| $SNR_T = \infty$ dB | ±0.3 | ±0.3 | 10 |
| $SNR_T = -6$ dB | ±0.3 | ±0.3 | 0.5 |

As can be known from Table (5) and the properties of the first correlation $R_{B-}^{n_w}$ and the second correlation $R_{B+}^{n_w}$, in a case where the watermark identification code is not present, the first correlation $R_{B-}^{n_w}$ and the second correlation $R_{B+}^{n_w}$ may be configured for determining the noise interference (i.e., $SNR_T$=∞dB or $SNR_T$=−6 dB) in the network transfer. Accordingly, whether at least one code is present in the sound watermark signal can be identified through the coding threshold $Th_D$.

Figure 6:
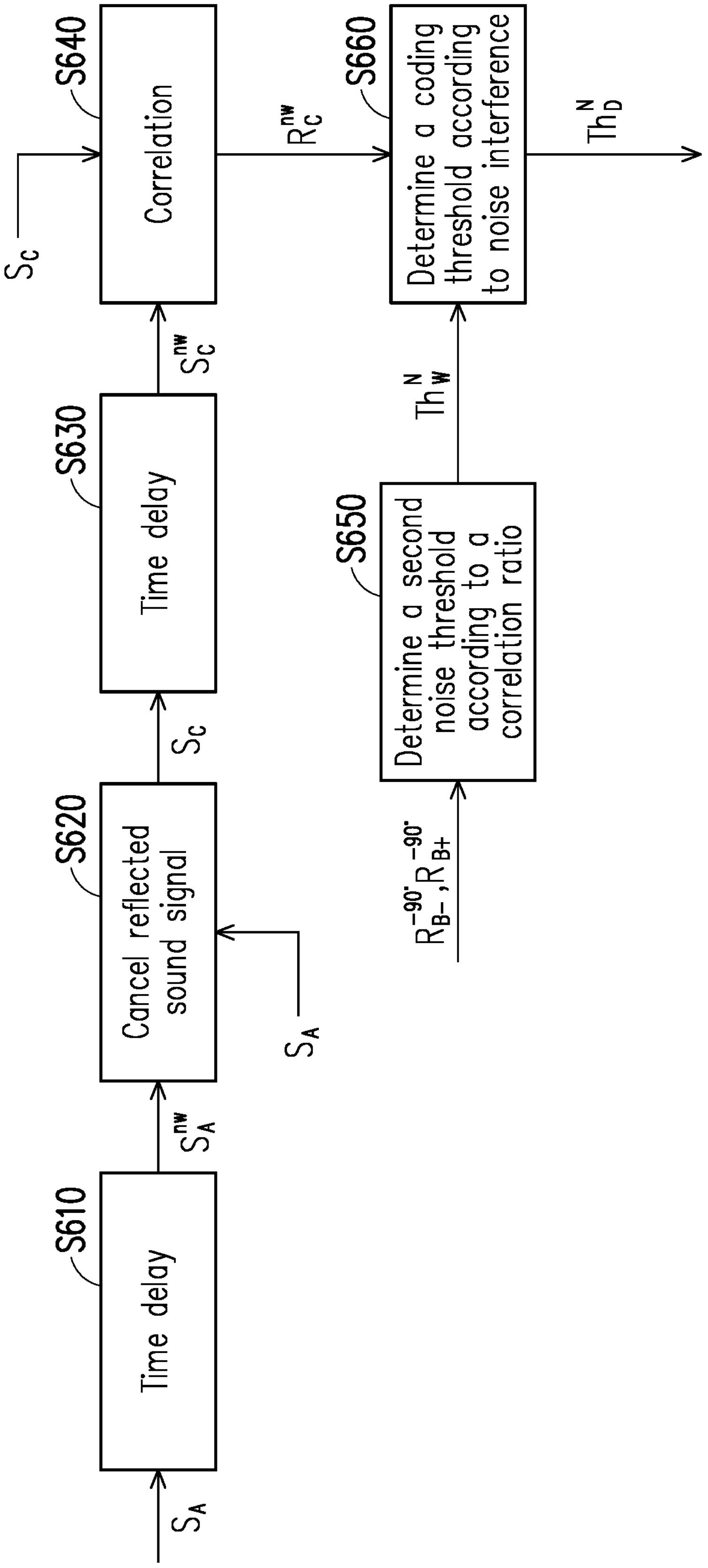
FIG. 6 is a flowchart showing determination of a coding threshold according to another embodiment of the disclosure.

FIG. 6 is a flowchart showing determination of a coding threshold according to another embodiment of the disclosure. With reference to FIG. 6, in an embodiment, a coding threshold includes a first noise threshold and a second noise threshold. The processor 19 generates a pre-processed sound signal $s_A^{n_w}$ according to the delay time $n_w$ and the synthesized sound signal $S_A$ (step S610). Specifically, the pre-processed sound signal $s_A^{n_w}$ is obtained from the synthesized sound signal $S_A$ being delayed by the delay time $n_w$. The relationship between the pre-processed sound signal $s_A^{n_w}$ and the synthesized sound signal $S_A$ may be expressed as follows:

$$S_A^{n_w}(n)=s_A(n-n_w) \quad (15)$$

The relationship between the pre-processed sound signal $s_A^{n_w}$ and the conversation-received sound signal $S_{Rx}$ may be expressed as follows:

$$s_A^{n_w}(n)=\begin{cases}\alpha_T\cdot\left[S_{Rx}(n-n_w)+\alpha_w\cdot s_{RX}^{90°}(n-2\cdot n_w)\right]+N_T(n-n_w), & W_0=1\\ \alpha_T\cdot\left[S_{Rx}(n)-\alpha_w\cdot s_{RX}^{90°}(n-2\cdot n_w)\right]+N_T(n-n_w), & W_0=0\\ \alpha_T\cdot\left[S_{Rx}(n)+\alpha_w\cdot S_{Rx}(n-2\cdot n_w)\right]+N_T(n-n_w), & W_0=N/A\end{cases} \quad (16)$$

Then, the processor 19 generates a fifth sound signal $s_C$ according to the synthesized sound signal $S_A$ and the pre-processed sound signal $s_A^{n_w}$ (step S620). The relationship between the fifth sound signal $s_C$ and the synthesized sound signal SA may be expressed as follows:

$$s_C = s_A - \alpha_w \cdot s_A^{n_w} \tag{17}$$

The relationship between the fifth sound signal $s_C$ and the conversation-received sound signal $S_{Rx}$ may be expressed as follows:

$$s_C(n) = \begin{cases} \alpha_T \cdot \left[s_{RX}(n) - \alpha_w \cdot S_{Rx}(n-n_w) + \alpha_w \cdot s_{RX}^{90^\circ}(n-n_w) - \alpha_w^2 \cdot s_{RX}^{90^\circ}(n-2\cdot n_w)\right] \\ \quad + N_T(n) - \alpha_w \cdot N_T(n-n_w),\ W_0 = 1 \\ \alpha_T \cdot \left[s_{RX}(n) - \alpha_w \cdot S_{Rx}(n-n_w) - \alpha_w \cdot s_{RX}^{90^\circ}(n-n_w) + \alpha_w^2 \cdot s_{RX}^{90^\circ}(n-2\cdot n_w)\right] \\ \quad + N_T(n) - \alpha_w \cdot N_T(n-n_w),\ W_0 = 0 \\ \alpha_T \cdot \left[s_{RX}(n) + \alpha_w^2 \cdot s_{RX}(n-2\cdot n_w)\right] + N_T(n) - \alpha_w \cdot N_T(n-n_w),\ W_0 = N/A \end{cases} \tag{18}$$

In this embodiment, the reflection-cancelling sound signal includes the fifth sound signal $s_C$. The fifth sound signal $s_C$ cancels the synthesized sound signal in a case where the sound watermark signal is not any code (e.g., $W_0$=N/A).

With reference to FIG. 6, the processor 19 generates a sixth sound signal $sn_C^{n_w}$ according to the fifth sound signal $s_C$ (step S630). In this embodiment, the fifth sound signal $s_C$ is delayed by the delay time $n_w$ to generate the sixth sound signal $S_C^{n_w}$. The relationship between the sixth sound signal $s_C^{n_w}$ and the fifth sound signal $s_C$ may be expressed as follows:

$$s_C^{n_w}(n) = s_C(n-n_w) \tag{19}$$

The processor 19 determines a third correlation $R_C^{n_w}$ according to the fifth sound signal $s_C$ and the sixth sound signal $s_C^{n_w}$ (step S640). Specifically, the processor 19 calculates the cross-correlation between the fifth sound signal $s_C$ and the sixth sound signal $s_C^{n_w}$ to obtain the third correlation $R_C^{n_w}$. The third correlation $R_C^{n_w}$ corresponds to the magnitude of the noise interference. For example, the relationship between the third correlation $R_C^{n_w}$, the signal-to-noise ratio $SNR_T$ corresponding to the noise interference, and the watermark identification code $W_0$ may be expressed as follows:

TABLE 6

| $R_C^{n_w}$ | $W_0 = 1$ | $W_0 = 0$ | $W_0 = N/A$ |
|---|---|---|---|
| $SNR_T = \infty$ dB | −6 | −6 | ±0.3 |
| $SNR_T = -6$ dB | −5 | −5 | −4.8 |

In other words, when the watermark identification code is the first code (i.e., $W_0$=1), the result of the third correlation $R_C^{n_w}$ between $s_{Rx}(n-n_w)$, $s_{Rx}^{90°}(n-2\cdot n_w)$, $N_T(n-n_w)$ in the fifth sound signal $s_C$ and the sixth sound signal $s_C^{n_w}$ is a negative correlation. In addition, the correlation is high and negative (e.g., $R_C^{n_w}$=−6) when the transfer environment is noise-free ($SNR_T$=∞dB), and the correlation is high and negative (e.g., $R_c^{n_w}$=−5) when the transmission environment is a large noise environment ($SNR_T$=−6 dB). Moreover, the watermark identification code, when being the second code (i.e., $W_0$=0), has the same properties as the first code. It is worth noting that, only when the watermark identification code is not present in the synthesized sound signal $S_A$ (i.e., $W_0$=N/A), the noise part $N_T^{90°}(n-n_w)$ in the sound signal is negatively correlated. Therefore, when the watermark identification code is not present in the synthesized sound signal $S_A$ (i.e., $W_0$=N/A), the correlation is low (e.g., $R_C^{n_w}$=±0.3) when the transmission environment is noise-free ($SNR_T$=∞dB), and the correlation is high (e.g., $R_C^{n_w}$=−4.8) when the transmission environment is a large noise environment ($SNR_T$=−6 dB).

The processor 19 determines a first noise threshold $Th_{NA}^N$ according to the third correlation $R_C^{n_w}$. For example, the relationship between the first noise threshold $Th_{NA}^N$ and the third correlation $R_C^{n_w}$ may be expressed as follows:

$$Th_{NA}^N = 1 + \frac{3.25 - \left|R_C^{n_w}\right|}{3} \tag{20}$$

Then, according to Table (6) and the properties of the third correlation $R_C^{n_w}$, the relationship between the first noise threshold $Th_{NA}^N$, the signal-to-noise ratio $SNR_T$ corresponding to the noise interference, and the watermark identification code $W_0$ can be drawn, and may be expressed as follows:

TABLE 7

| $Th_{NA}^N$ | $W_0 = 1$ | $W_0 = 0$ | $W_0 = N/A$ |
|---|---|---|---|
| $SNR_T = \infty$ dB | 0.3 | 0.3 | 2.1 |
| $SNR_T = -6$ dB | 0.3 | 0.3 | 0.3 |

As can be known from Table (7) and the properties of the third correlation $R_C^{n_w}$, in a case where the watermark identification code is not present (e.g., $W_0$=N/A), the third correlation $R_C^{n_w}$ is less and the first noise threshold $Th_{NA}^N$ is greater if there is no noise interference (e.g., $SNR_T$=∞dB), and the third correlation $R_C^{n_w}$ is greater and the first noise threshold $Th_{NA}^A$ is less if the noise interference is large (e.g., $SNR_T$=−6 dB). The first noise threshold $Th_{NA}^N$ is configured for identifying whether at least one code is present in the sound watermark signal in the synthesized sound signal.

In addition, the processor 19 determines a second noise threshold $Th_W^N$ according to a correlation ratio (step S650). Reference may be made to FIG. 4 for the detailed description of step S650, which will not be repeated herein. In other words, the second noise threshold $Th_W^N$ determined in this embodiment is the coding threshold $Th_W^N$ determined in step S450.

Then, the processor 19 determines a final coding threshold $Th_D^N$ according to the first noise threshold $Th_{NA}^N$ and the second noise threshold $Th_W^N$ (step S660). In an embodiment, the coding threshold $Th_D^N$ is related to a greatest one of a difference ($Th_{NA}^N$-$Th_w^N$) between the first noise threshold $Th_{NA}^N$ and the second noise threshold $Th_W^N$, and the second noise threshold $Th_W^N$. The relationship between the coding threshold $Th_D^N$, the first noise threshold $Th_{NA}^N$, and the second noise threshold $Th_W^N$ may be expressed as follows:

$$Th_D^N = \max\{Th_{NA}^N - Th_w^N, Th_w^N\} \tag{21}$$

The coding threshold $Th_D^N$ is configured for identifying whether at least one code is present in the sound watermark signal in the synthesized sound signal $S_A$ and whether the sound watermark signal in the synthesized sound signal $S_A$ is the at least one code (e.g., $W_0$=N/A, $W_0$=1, or $W_0$=0). According to the properties of Table (5) and Table (7), the relationship between the coding threshold $Th_D^N$, the signal-to-noise ratio $SNR_T$ corresponding to the noise interference, and the watermark identification code $W_0$ can be drawn, and may be expressed as follows:

TABLE 8

| $Th_D^N$ | $W_0 = 1$ | $W_0 = 0$ | $W_0 = N/A$ |
|---|---|---|---|
| $SNR_T = \infty$ dB | 1.9 | 1.9 | 1.9 |
| $SNR_T = -6$ dB | 0.3 | 0.3 | 0.3 |

As can be known from Table (8), regardless of the value of the watermark identification code (e.g., $W_0$=N/A, 0, or 1), the coding threshold $Th_D^N$ is greater (e.g., $Th_D^N$=1.9) if there is no noise interference (e.g., $SNR_T$=∞dB), and the coding threshold $Th_D^N$ is less (e.g., $Th_D^N$=0.3) if the noise interference is large (e.g., $SNR_T$=−6 dB), accordingly conforming to the properties and the range of noise changes in the environment.

Figure 7:
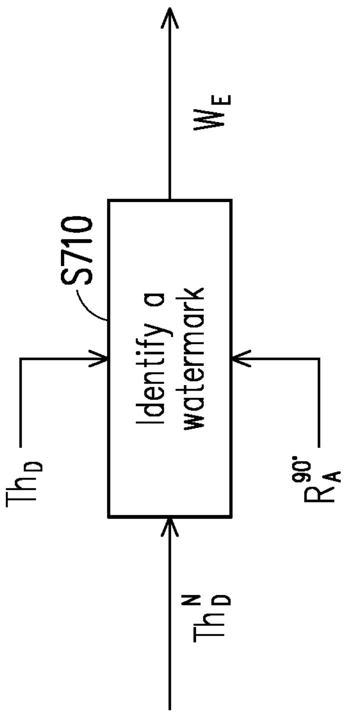
FIG. 7 is a flowchart of identifying a sound watermark signal according to an embodiment of the disclosure.

With reference to FIG. 2, the processor 19 identifies the sound watermark signal $S_{WM}$ in the synthesized sound signal $S_A$ according to the coding threshold (step S240). Specifically, the processor 19 generates a synthesized sound signal $S_A^{90°}$ with a phase shift of 90°. FIG. 7 is a flowchart of identifying a sound watermark signal according to an embodiment of the disclosure. According to a correlation $R_a^{90°}$ between the synthesized sound signal $S_A$ and the phase-shifted synthesized sound signal $S_A^{90°}$, the processor 19 may identify a watermark identification code $W_E$ (step S710). For example, the processor 19 calculates the orthogonal cross-correlation $R_A^{90°}$ between the synthesized sound signal $S_A$ and the synthesized sound signal $S_A^{90°}$, where $-1 \le R_A^{90°} \le 1$. The processor 19 defines the coding thresholds $Th_D^N$ and $Th_D$, and the watermark identification code $W_E$ may then be expressed as:

$$W_E = \begin{cases} N/A, & |R_A^{90°}| \le Th_D^N \text{ and } |R_A^{90°}| \le Th_D \\ (23), & \text{else} \end{cases} \tag{22}$$

$$W_E = \begin{cases} 1, & R_A^{90°} > 0 \\ 0, & \text{else} \end{cases} \tag{23}$$

In other words, if the absolute value of the correlation $R_A^{90°}$ is lower than the coding thresholds $Th_D^N$ and $Th_D$, the processor 19 determines that the value of this bit is not any code (e.g., N/A); if the correlation $R_A^{90°}$ is higher than the coding threshold $Th_D^N$ or $Th_D$, the processor 19 further determines the correlation $R_A^{90°}$, and accordingly determines whether the value of this bit corresponds to the value of a phase shift of −90° (e.g., 0) or the value of a phase shift of 90° (e.g., 1). In other words, the coding threshold $Th_D$ may be configured to assist in checking whether the sound signal is any code in the watermark identification code. In addition, to prevent influences by noise, the other part of the identification is to determine the coding threshold $Th_D^N$ according to the properties of noise interference changes. Finally, the processor 19 may compare the coding threshold $Th_D^N$ or $Th_D$ with the correlation $R_A^{90°}$ to thus determine the watermark identification code more accurately.

In another embodiment, the processor 19 may identify the corresponding values of the synthesized sound signal $S_A$ in different time units through a classifier based on deep learning.

Regarding changing noise interference, for example, according to experimental experiences, in a case where the transmission process of the synthesized sound signal $S_A$ belongs to a large noise interference environment (e.g., $SNR_T$=−6 dB), the identification accuracy can be improved using a coding threshold of 1.9 to identify the watermark identification code of the sound watermark signal $S_{WM}$. In addition, in a case where the transmission process of the synthesized sound signal $S_A$ belongs to a noise-free environment (e.g., $SNR_T$=∞dB), the watermark identification code in the sound watermark signal $S_{WM}$ can be correctly identified using a coding threshold of 0.3.

In summary of the foregoing, in the identifying method of a sound watermark and the sound watermark identifying apparatus of the embodiments of the disclosure, through the properties of the virtual reflected sound signal and the reflection-cancelling sound signal in the synthesized sound signal, the noise interference in the transfer environment is determined accordingly. In addition, the coding threshold of the watermark identification code to be determined is determined through the noise interference. Accordingly, the correct rate of identifying the watermark identification code can be increased using coding thresholds corresponding to different transmission environments.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An identifying method of a sound watermark, the identifying method being adapted for a conference terminal, and the identifying method comprising:

receiving a synthesized sound signal through a network, wherein the synthesized sound signal comprises a sound watermark signal, the sound watermark signal is generated by shifting a phase of a reflected sound signal according to a watermark identification code, and the reflected sound signal is a sound signal obtained from simulating a sound emitted by a sound source reflected by an external object and recorded by a sound receiver;

determining noise interference transferred through the network in the synthesized sound signal according to at least one reflection-cancelling sound signal, wherein the at least one reflection-cancelling sound signal cancels a sound signal of the watermark identification code of the sound watermark signal being at least one code in the synthesized sound signal;

determining a coding threshold according to the noise interference, wherein the coding threshold comprises a first threshold and a second threshold, noise interference corresponding to the first threshold is lower than noise interference corresponding to the second threshold, and the first threshold is greater than the second threshold; and identifying the sound watermark signal in the synthesized sound signal according to the coding threshold.

2. The method according to claim 1, wherein determining the noise interference comprises:

generating a pre-processed sound signal according to a delay time and the synthesized sound signal, wherein the pre-processed sound signal is obtained from the synthesized sound signal being phase-shifted and delayed by the delay time;

respectively generating a first sound signal and a second sound signal according to the synthesized sound signal and the pre-processed sound signal, wherein the at least one code comprises a first code and a second code, the at least one reflection-cancelling sound signal comprises the first sound signal and the second sound signal, the first sound signal cancels the synthesized sound signal in a case where the watermark identification code is the first code, and the second sound signal cancels the synthesized sound signal in a case where the watermark identification code is the second code;

generating a third sound signal according to the first sound signal, and generating a fourth sound signal according to the second sound signal, wherein the first sound signal is phase-shifted and delayed by the delay time to generate the third sound signal, and the second sound signal is phase-shifted and delayed by the delay time to generate the fourth sound signal; and respectively determining a first correlation and a second correlation according to the third sound signal and the fourth sound signal, wherein the first correlation is a correlation between the first sound signal and the third sound signal, the second correlation is a correlation between the second sound signal and the fourth sound signal, and a difference between absolute values of the first correlation and the second correlation corresponds to a magnitude of the noise interference.

3. The method according to claim 2, wherein the watermark identification code is a binary system, then two values be provided for each bit, the two values, which are different, respectively correspond to two phase shifts.

4. The method according to claim 2, wherein determining the coding threshold according to the noise interference comprises:

determining the coding threshold according to a correlation ratio, wherein the correlation ratio is related to an absolute value of a sum of the first correlation and the second correlation, and to a greatest one of the absolute values of the first correlation and the second correlation, and the coding threshold is configured for identifying whether the sound watermark signal in the synthesized sound signal is the at least one code.

5. The method according to claim 2, wherein determining the coding threshold according to the noise interference comprises:

determining the coding threshold according to a sum of the first correlation and the second correlation, wherein the coding threshold is configured for identifying whether the at least one code is present in the sound watermark signal in the synthesized sound signal.

6. The method according to claim 2, wherein the coding threshold comprises a first noise threshold and a second noise threshold, and determining the coding threshold according to the noise interference comprises:

determining the first noise threshold according to a third correlation, wherein the third correlation is related to a correlation between a fifth sound signal and a sixth sound signal, the at least one reflection-cancelling sound signal comprises the fifth sound signal, the fifth sound signal cancels the synthesized sound signal in a case where the watermark identification code is not the at least one code, the sixth sound signal is a sound signal of the fifth sound signal being delayed by the delay time, and the first noise threshold is configured for identifying whether the at least one code is present in the sound watermark signal in the synthesized sound signal;

determining the second noise threshold according to a correlation ratio, wherein the correlation ratio is related to an absolute value of a sum of the first correlation and the second correlation, and to a greatest one of the absolute values of the first correlation and the second correlation, and the second noise threshold is configured for identifying whether the sound watermark signal in the synthesized sound signal is the at least one code; and determining the coding threshold according to the first noise threshold and the second noise threshold, wherein the coding threshold is related to a greatest one of a difference between the first noise threshold and the second noise threshold, and the second noise threshold, and the coding threshold is configured for identifying whether the at least one code is present in the sound watermark signal in the synthesized sound signal and whether the sound watermark signal in the synthesized sound signal is the at least one code.

7. The apparatus according to claim 6, wherein the third correlation is obtained by calculating a cross-correlation between the fifth sound signal and the sixth sound signal, and the third correlation corresponds to the magnitude of the noise interference.

8. The apparatus according to claim 6, wherein the watermark identification code is identified according to a correlation between the synthesized sound signal and the synthesized sound signal that is phase-shifted.

9. The apparatus according to claim 6, wherein when the watermark identification code is the first code or the second code, results of the first correlation and the second correlation are not correlated.

10. The method according to claim 1, wherein determining the noise interference comprises:

generating a pre-processed sound signal according to a delay time and the synthesized sound signal, wherein the pre-processed sound signal is obtained from the synthesized sound signal being phase-shifted and delayed by the delay time;

respectively generating a first sound signal and a second sound signal according to the synthesized sound signal and the pre-processed sound signal, wherein the at least one code comprises a first code and a second code, the at least one reflection-cancelling sound signal comprises the first sound signal and the second sound signal, the first sound signal cancels the synthesized sound signal in a case where the watermark identification code is the first code, and the second sound signal cancels the synthesized sound signal in a case where the watermark identification code is the second code;

generating a third sound signal according to the first sound signal, and generating a fourth sound signal according to the second sound signal, wherein the first sound signal is delayed by the delay time to generate the third sound signal, and the second sound signal is delayed by the delay time to generate the fourth sound signal; and respectively determining a first correlation and a second correlation according to the third sound signal and the fourth sound signal, wherein the first correlation is a correlation between the first sound signal and the third sound signal, the second correlation is a correlation between the second sound signal and the fourth sound signal, and a difference between absolute values of the first correlation and the second correlation corresponds to a magnitude of the noise interference.

11. An identifying apparatus of a sound watermark, comprising:

a memory, configured to store a programming code; and a processor, coupled to the memory, and configured to load and execute the programming code to:

receive a synthesized sound signal through a network, wherein the synthesized sound signal comprises a sound watermark signal, the sound watermark signal is generated by shifting a phase of a reflected sound signal according to a watermark identification code, and the reflected sound signal is a sound signal obtained from simulating a sound emitted by a sound source reflected by an external object and recorded by a sound receiver;

determine noise interference transferred through the network in the synthesized sound signal according to at least one reflection-cancelling sound signal, wherein the at least one reflection-cancelling sound signal cancels a sound signal of the watermark identification code of the sound watermark signal being at least one code in the synthesized sound signal;

determine a coding threshold according to the noise interference, wherein the coding threshold comprises a first threshold and a second threshold, noise interference corresponding to the first threshold is lower than noise interference corresponding to the second threshold, and the first threshold is greater than the second threshold; and identify the sound watermark signal in the synthesized sound signal according to the coding threshold.

12. The apparatus according to claim 11, wherein the processor is further configured to:

generate a pre-processed sound signal according to a delay time and the synthesized sound signal, wherein the pre-processed sound signal is obtained from the synthesized sound signal being phase-shifted and delayed by the delay time;

respectively generate a first sound signal and a second sound signal according to the synthesized sound signal and the pre-processed sound signal, wherein the at least one code comprises a first code and a second code, the at least one reflection-cancelling sound signal comprises the first sound signal and the second sound signal, the first sound signal cancels the synthesized sound signal in a case where the watermark identification code is the first code, and the second sound signal cancels the synthesized sound signal in a case where the watermark identification code is the second code;

generate a third sound signal according to the first sound signal, and generating a fourth sound signal according to the second sound signal, wherein the first sound signal is phase-shifted and delayed by the delay time to generate the third sound signal, and the second sound signal is phase-shifted and delayed by the delay time to generate the fourth sound signal; and respectively determine a first correlation and a second correlation according to the third sound signal and the fourth sound signal, wherein the first correlation is a correlation between the first sound signal and the third sound signal, the second correlation is a correlation between the second sound signal and the fourth sound signal, and a difference between absolute values of the first correlation and the second correlation corresponds to a magnitude of the noise interference.

13. The apparatus according to claim 12, wherein the watermark identification code is a binary system, then two values be provided for each bit, the two values, which are different, respectively correspond to two phase shifts.

14. The apparatus according to claim 12, wherein the processor is further configured to:

determine the coding threshold according to a correlation ratio, wherein the correlation ratio is related to an absolute value of a sum of the first correlation and the second correlation, and to a greatest one of the absolute values of the first correlation and the second correlation, and the coding threshold is configured for identifying whether the sound watermark signal in the synthesized sound signal is the at least one code.

15. The apparatus according to claim 12, wherein the processor is further configured to:

determine the coding threshold according to a sum of the first correlation and the second correlation, wherein the coding threshold is configured for identifying whether the at least one code is present in the sound watermark signal in the synthesized sound signal.

16. The apparatus according to claim 12, wherein the coding threshold comprises a first noise threshold and a second noise threshold, and the processor is further configured to:

determine the first noise threshold according to a third correlation, wherein the third correlation is related to a correlation between a fifth sound signal and a sixth sound signal, the at least one reflection-cancelling sound signal comprises the fifth sound signal, the fifth sound signal cancels the synthesized sound signal in a case where the watermark identification code is not the at least one code, the sixth sound signal is a sound signal of the fifth sound signal being delayed by the delay time, and the first noise threshold is configured for identifying whether the at least one code is present in the sound watermark signal in the synthesized sound signal;

determine the second noise threshold according to a correlation ratio, wherein the correlation ratio is related to an absolute value of a sum of the first correlation and the second correlation, and to a greatest one of the absolute values of the first correlation and the second correlation, and the second noise threshold is configured for identifying whether the sound watermark signal in the synthesized sound signal is the at least one code; and determine the coding threshold according to the first noise threshold and the second noise threshold, wherein the coding threshold is related to a greatest one of a difference between the first noise threshold and the second noise threshold, and the second noise threshold, and the coding threshold is configured for identifying whether the at least one code is present in the sound watermark signal in the synthesized sound signal and whether the sound watermark signal in the synthesized sound signal is the at least one code.

17. The apparatus according to claim 16, wherein the third correlation is obtained by calculating a cross-correlation between the fifth sound signal and the sixth sound signal, and the third correlation corresponds to the magnitude of the noise interference.

18. The apparatus according to claim 16, wherein the watermark identification code is identified according to a correlation between the synthesized sound signal and the synthesized sound signal that is phase-shifted.

19. The apparatus according to claim 16, wherein when the watermark identification code is the first code or the second code, results of the first correlation and the second correlation are not correlated.

20. The apparatus according to claim 11, wherein the processor is further configured to:

generate a pre-processed sound signal according to a delay time and the synthesized sound signal, wherein the pre-processed sound signal is obtained from the synthesized sound signal being phase-shifted and delayed by the delay time;

respectively generate a first sound signal and a second sound signal according to the synthesized sound signal and the pre-processed sound signal, wherein the at least one code comprises a first code and a second code, the at least one reflection-cancelling sound signal comprises the first sound signal and the second sound signal, the first sound signal cancels the synthesized sound signal in a case where the watermark identification code is the first code, and the second sound signal cancels the synthesized sound signal in a case where the watermark identification code is the second code;

generate a third sound signal according to the first sound signal, and generating a fourth sound signal according to the second sound signal, wherein the first sound signal is delayed by the delay time to generate the third sound signal, and the second sound signal is delayed by the delay time to generate the fourth sound signal; and respectively determine a first correlation and a second correlation according to the third sound signal and the fourth sound signal, wherein the first correlation is a correlation between the first sound signal and the third sound signal, the second correlation is a correlation between the second sound signal and the fourth sound signal, and a difference between absolute values of the first correlation and the second correlation corresponds to a magnitude of the noise interference.

* * * * *